Patented May 12, 1936

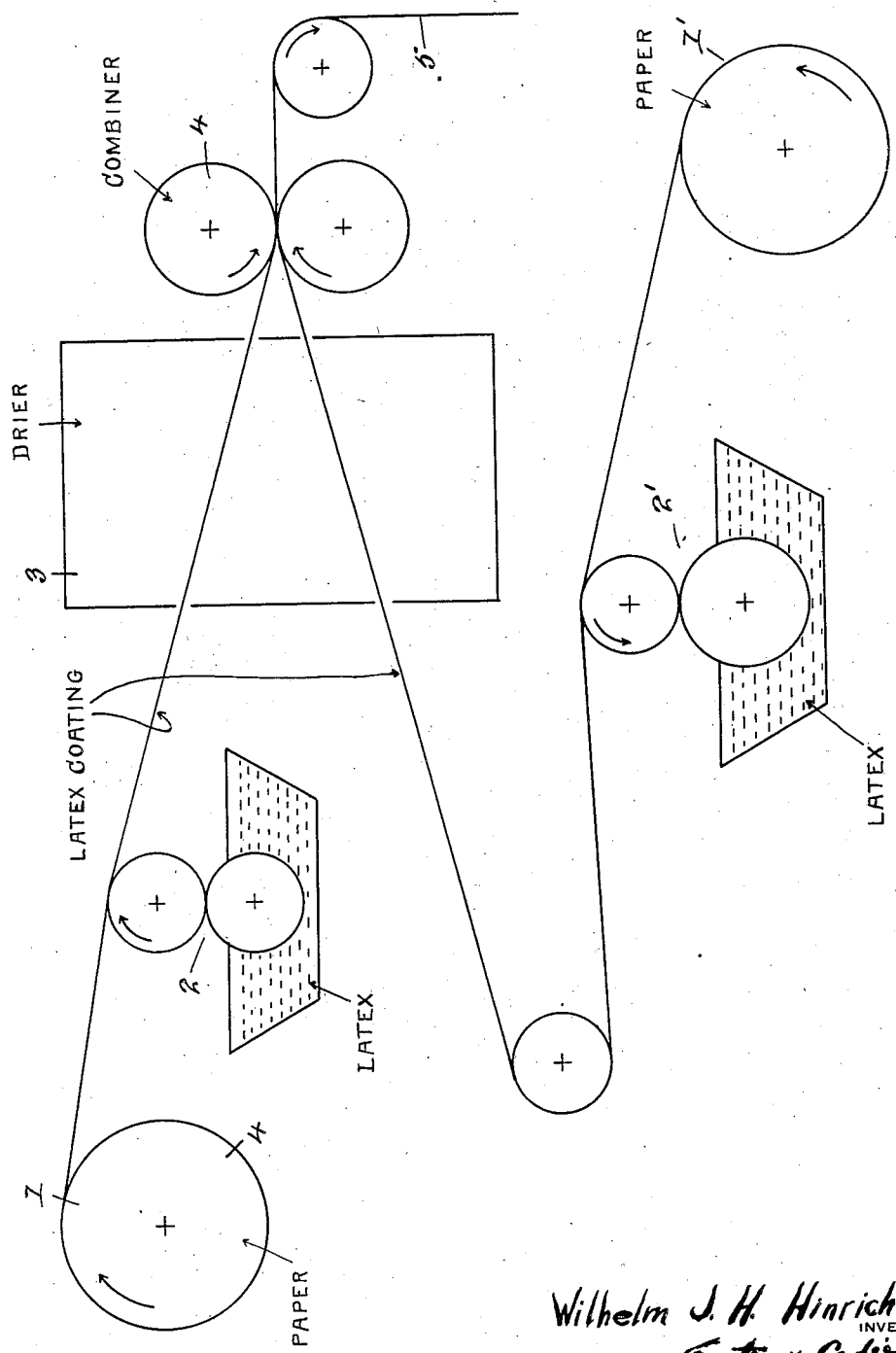

2,040,608

UNITED STATES PATENT OFFICE 2,040,608

METHOD OF PRODUCING MOISTUREPROOF AND AIRTIGHT MATERIALS

Wilhelm J. H. Hinrichs, Hamburg, Germany

Application July 21, 1933, Serial No. 681,662
In Germany March 15, 1933

1 Claim. (Cl. 154—40)

In my copending application Serial No. 681,661, filed July 21, 1933, now U. S. Patent No. 2,002,192, granted May 28, 1935, I have described and claimed a method of producing moistureproof and airtight coatings comprising applying to articles of food, wearing apparel, wood veneers, fabrics and the like, a highly concentrated latex from which the decomposable and hygroscopic constituents contained in natural latex are substantially completely removed.

This invention relates to a method of producing moistureproof and airtight laminated structures.

It previously had been proposed to apply rubber latex to materials of different kinds, especially fibrous materials like paper or board, to obtain a water-proof coating. As the results attained were unsatisfactory, various substances were added to the latex, such as colloidal clay, a shellac solution or emulsion or heavy metal soaps, but it has been found that none of these methods insures the total exclusion of moisture.

During the application of the latex solution, and particularly if it contains additions capable of penetrating into the inside of the material, the fine little fibers of the paper or board will at first project through the still moist coat. In view of the great capillarity of the fibers, this suffices to enable the moisture after drying of the coat to penetrate the latter and to reach the goods packed in the materials or to dilute them whereby the moisture content of the goods is increased or reduced, either of which event is of course, undesirable.

The object of the invention is to provide a method, the application of which will fully eliminate these drawbacks.

It has been found that in order to attain this object it is necessary, above all, not to use ordinary rubber latex but to proceed from a latex whose dry substance or rubber content is enriched to about 60% and which is freed from constituents having hygroscopic properties or being easily decomposable. A latex of this kind can be obtained, for example, by repeated washing with ammonia-containing water and centrifuging in rapidly rotating machines.

To carry out the method according to the invention, this highly concentrated and non-hygroscopic latex, free of constituents easily decomposable, is applied to each of the surfaces of the laminations to be united, e. g. by brushing or spraying, whereupon the layers thus obtained are permitted to dry for about fifteen minutes.

The drying operation can be accelerated by employing suitable heating or ventilating means. When dry, the two laminations are pressed together with their latex layers facing one another, whereby complete union is attained. Since it is practically impossible that the fine fibers in the two compressed latex layers are positioned everywhere exactly opposite one another, the passage of moisture from one side of the material to the other is thus effectively prevented.

Reference is made at this point to a diagrammatic showing of apparatus suitable for carrying out the present invention. In this apparatus, as may be seen by reference to the accompanying drawing, rolls of paper 1 and 1' are coated with latex by coating apparatus 2 and 2'. The coatings of latex are then dried by passing them through drying chamber 3, and the dried webs are combined in combiner 4 to form the finished sheet 5.

The method may be applied also to any suitable materials including, besides paper and board, fabrics, wood, preferably in the form of thin veneer, and the like. It is possible to combine paper with paper, board with board or the like, or paper with board, board with fabric, paper with veneer, and the like.

In carrying out the process, coatings of latex may be formed on webs or widths of the material or materials to be combined by brushing, spraying, rolling or the like. If the material is to consist of more than two plies or layers, with interposed latex coatings, the middle layer may be passed through a latex bath and, after drying, be united with two outer layers of material also provided with dried latex coatings.

According to the purpose in view, the rubber latex used for carrying out the invention may be provided with suitable disinfecting additions, such as boric or salicylic acid, and also with coloring matters such as aniline dyes and with fillers such as china clay.

I claim:—

A method of manufacturing a moisture-proof composite laminated material comprising at least two layers of sheet material, which comprises applying a coating of latex, which latex has been concentrated by centrifuging and purified by washing with ammonia water, to at least one surface of each of said layers of sheet material, drying said coated surfaces and combining said layers so that a coated surface contacts some other coated surface.

WILHELM J. H. HINRICHS.